US008583626B2

(12) United States Patent
Mandelstein et al.

(10) Patent No.: US 8,583,626 B2
(45) Date of Patent: Nov. 12, 2013

(54) METHOD TO DETECT REFERENCE DATA TABLES IN ETL PROCESSES

(75) Inventors: Dan J. Mandelstein, Austin, TX (US); Ivan M. Milman, Austin, TX (US); Martin Oberhofer, Bonndorf (DE); Sushain Pandit, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/415,047

(22) Filed: Mar. 8, 2012

(65) Prior Publication Data

US 2013/0238596 A1 Sep. 12, 2013

(51) Int. Cl.
*G06F 17/30* (2006.01)

(52) U.S. Cl.
USPC .......................................... 707/714

(58) Field of Classification Search
USPC .......................................... 707/602
See application file for complete search history.

(56) References Cited

U.S. PATENT DOCUMENTS

| | | | |
|---|---|---|---|
| 7,305,419 B1 | 12/2007 | Cosby et al. | |
| 2007/0011134 A1 | 1/2007 | Langseth et al. | |
| 2007/0074155 A1* | 3/2007 | Ama et al. ................. | 717/106 |
| 2008/0222634 A1 | 9/2008 | Rustagi | |
| 2010/0094910 A1 | 4/2010 | Bayliss | |
| 2010/0114841 A1 | 5/2010 | Holenstein et al. | |
| 2010/0185637 A1* | 7/2010 | Morris et al. ............... | 707/758 |
| 2010/0205044 A1 | 8/2010 | Scheer | |
| 2010/0211539 A1* | 8/2010 | Ho ........................... | 707/602 |
| 2011/0055147 A1 | 3/2011 | Joerg et al. | |

OTHER PUBLICATIONS

Discovering Direct and Indirect Matches for Schema Element by Li Xu and David W. Embley, Proceedings of the Eight Internationa Conference on Database Systems for Advanced Applications (DASFAA '03), 0-7695-1895/03, 2003 IEEE.*
PolarLake, How can you leverage your Reference Data to reduce operational risk and costs?, Jan. 2007, PolarLake, New York, New York, United States.
Bechhofer, Sean,OWL Web Ontology Language Parsing OWL in RDF/XML, Jan. 2004, W3C, <http://www.w3.org/TR/owl-parsing/>.
Buckley, Warren, Financial and Reference data Management Industry Insights: Why ETL just isn't good enough for Reference data Distribution, Sep. 2011, PolarLake, <http://www.polarlake.com/industry-insights/article/why_etl_just_isnt_good_enough_for_reference_data_distribution>.
Mandelstein, Dan J. et al, "A Method to Detect Transcoding Tables in ETL Processes", filed Mar. 8, 2012.

* cited by examiner

*Primary Examiner* — Robert Beausoliel, Jr.
*Assistant Examiner* — Hau H Hoang
(74) *Attorney, Agent, or Firm* — Patterson & Sheridan, LLP

(57) ABSTRACT

A method, system and computer program product for identifying reference data tables in an Extract-Transform-Load (ETL) process, by identifying, by operation of one or more computer processors, at least a first reference data operator in the process, wherein the first reference data operator references one or more tables and evaluating at least a first table referenced by the reference data operator to determine whether the first table is a reference data table by assigning a score to the first table, wherein the score is indicative of the likelihood that the first table is a reference data table and wherein a reference data table contains a set of values that describes other data.

20 Claims, 8 Drawing Sheets

| TABLE | TOTAL RESULT SCORE | REF TABLE? | | LOAD? |
|---|---|---|---|---|
| | | YES | NO | |
| $T_1$ | 100 | ● | ○ | ☑ |
| $T_2$ | 98 | ○ | ● | ☐ |
| $T_3$ | 88 | ● | ○ | ☑ |
| $T_4$ | 80 | ● | ○ | ☑ |
| $T_N$ | 40 | ○ | ● | ☐ |

RESET

TOTAL RESULT SCORE

FIG. 8

METHOD TO DETECT REFERENCE DATA TABLES IN ETL PROCESSES

BACKGROUND

Embodiments disclosed herein provide techniques for detecting reference data tables in Extract, Transform, and Load (ETL) processes.

ETL processes are implemented in programs organized in project folders for a data integration solution. Thus, the installation of data integration software might have one or multiple processes with one or multiple jobs grouped into each of the processes. ETL processes typically integrate data from multiple, heterogeneous data sources into a central repository, such as a data warehouse (DW) or a master data management (MDM) system. Reference data generally defines a set of values that describes other data. Some examples of reference data are: gender, country codes, courtesy titles (Mr., Mrs., Miss, Dr., etc.), units of measure, and so on. Reference data can be found in applications by code tables, lookup tables, properties files, or it may be hard-coded. Consistent reference data is the cornerstone of many information centric applications such as data warehousing, master data management (MDM), as well as in operational business applications such as customer relationship management (CRM) and enterprise resource planning (ERP). Without consistent reference data, many business problems can occur. For example, in DW environments, revenue reports by country and customer type, created using reference data describing these entities, may produce incorrect results due to the inconsistent reference data. In MDM environments, product categorization may produce unexpected results, and customer information cannot be established, without consistent reference data for each type of entity.

Reference Data Management (RDM) systems have emerged to ensure consistency of reference data across applications and between enterprises. RDM systems vary from implementation to implementation, but generally an RDM solution provides a single place for business owners to create, update, review and distribute reference data across an enterprise.

Reference data management solutions are particularly useful in data integration projects. Typically, at any given point in time in medium to large enterprises, there are one or more data integration projects being implemented to, for example, add additional sources to a data warehouse and standardize data from multiple legacy systems prior to integration into SAP applications.

In many ETL processes, reference data is used to transcode source reference data values to target reference data values, such that reference data is harmonized in the target system when a process is complete. Transcoding is needed where one or more code values in the source system has a different meaning in the target system, or where the code values for the same meaning are different in the source and target system. Both issues are addressed by implementing transcoding tables harmonizing the reference data while data is exchanged between one or more source and target systems. Reference data is also used in every ETL process in order to validate data in order to ensure its "loadability" into the target against reference data tables from the target.

SUMMARY

Embodiments disclosed herein provide a method, computer program product, and system for identifying reference data tables in an extract-transform-load data integration process, by identifying, by operation of one or more computer processors, at least a first reference data operator in the process, wherein the first reference data operator references one or more tables and evaluating at least a first table referenced by the reference data operator to determine whether the first table is a reference data table by assigning a score to the first table, wherein the score is indicative of the likelihood that the first table is a reference data table and wherein a reference data table contains a set of values that describes other data.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

FIG. 8 illustrates an exemplary graphical user interface (GUI) screen displaying an exemplary list of candidate reference data tables presented to a user, according to one embodiment disclosed herein.

DETAILED DESCRIPTION

Figure 1:
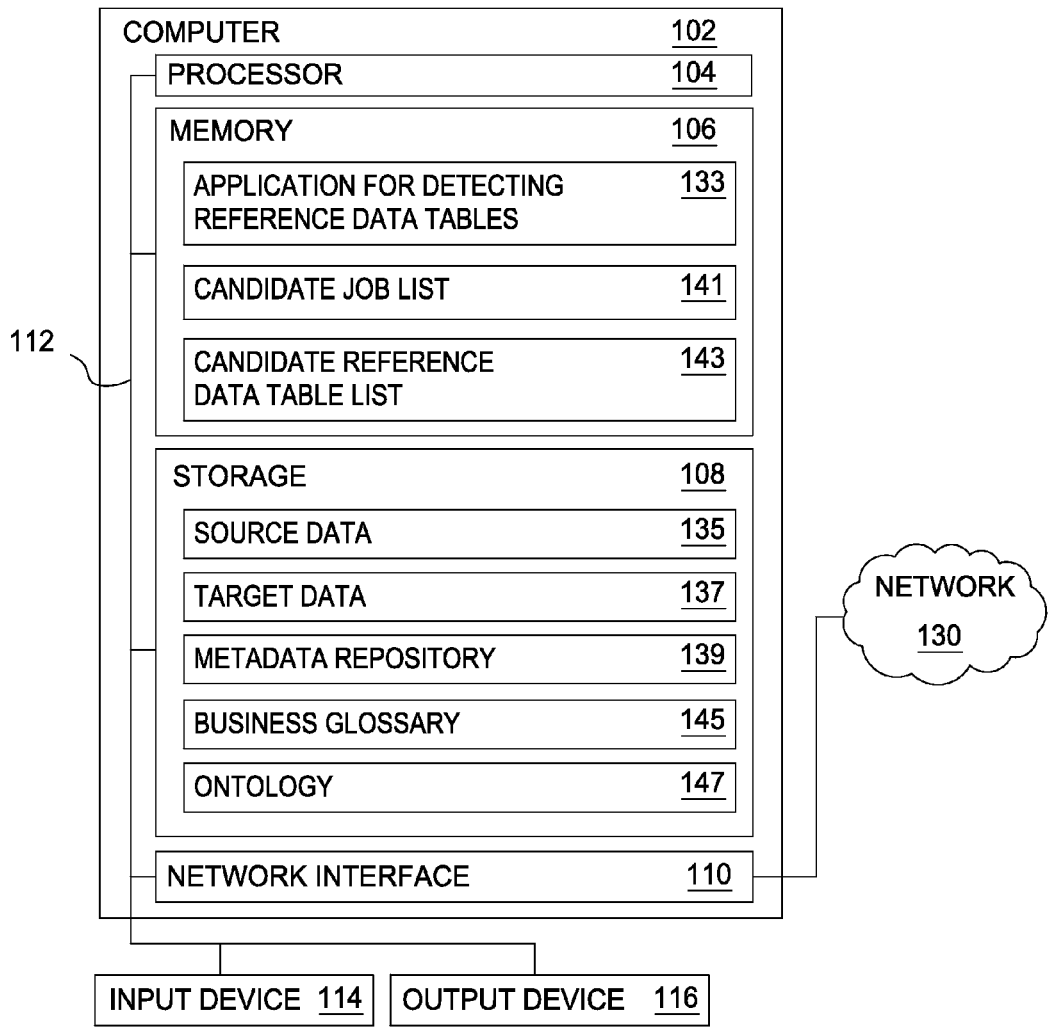
FIG. 1 is a block diagram illustrating a system for detecting reference data tables in an ETL process, according to one embodiment disclosed herein.

Embodiments of the present invention provide techniques for detecting reference data tables in ETL processes. In one embodiment, an application may be configured to analyze a plurality of jobs in an ETL process to identify one or more jobs in the process that include a potential reference data operator. For each of the identified one or more jobs, the application then analyzes at least one table referenced by the identified job to determine whether the candidate reference table is a reference data table. The application then assigns a score to the at least one table. The score generally indicates a likelihood that the candidate reference table is a reference data table. After identifying the candidate reference tables, a graphical interface may present a user with a list of each table and its respective score. The user may then mark each candidate reference table a reference data table or not. The application may then, upon user approval, automatically load the entities marked as reference data tables into a data store. In some embodiments, if the assigned score exceeds a specified threshold, the at least one table is automatically loaded into a data store without being presented to the user for approval. In some embodiments, the data store is a reference data management system.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications to detect reference data tables or related data available in the cloud. For example, the application for detecting reference data tables in an ETL process could execute on a computing system in the cloud and detect reference data tables in ETL processes. In such a case, the application for detecting reference data tables in an ETL process could detect and score candidate reference data tables and store results of each candidate reference data table at a storage location in the cloud for user review. Doing so allows a user to access this information from any computing system attached to a network connected to the cloud (e.g., the Internet).

As described above, reference data tables in most cases are tables into which an enumerated set of possible values of a certain field data type are divested. A sample reference data is provided for illustration:

| PK | Country_Code | Country_Description |
|----|--------------|---------------------|
| 1  | UK           | United Kingdom      |
| 2  | US           | United States       |
| 3  | ...          | ...                 |

The sample table contains primary key (PK), Country_Code, and Country_Description columns. The reference data table provides a mapping between Country_Code and Country_Description. A problem arises when different source systems have different mappings (e.g. "USA" for United States, conflicting with "US" above). Reference data loaded into an ETL process from tables with different reference data table entries will produce inconsistent and unreliable results, as described above. Transcoding tables have been implemented to address this problem, by harmonizing reference data while data is exchanged between one or more source and target systems. A sample transcoding table is provided for illustration:

| PK | Source_ID | Source_Value | Source_Description       | Target_ID | Target_Value | Target_Description |
|----|-----------|--------------|--------------------------|-----------|--------------|--------------------|
| 1  | 1         | UK           | United Kingdom           | 1         | 1            | United Kngdom      |
| 2  | 1         | US           | United States            | 2         | 2            | United States      |
| 1  | 2         | USA          | United States of America | 2         | 2            | United States      |
| 2  | 2         | ENG          | England                  | 1         | 1            | United Kingdom     |
| 3  | 2         | GER          | Germany                  | 3         | 3            | Germany            |

This sample transcoding table contains a plurality of columns which are used to ensure that reference data validated against it will be transformed in an ETL process to the same target values. For example, while having two Source_Value and Source_Descriptions related to the same country (e.g., US/United States and USA/United States of America), the transcoding table provides a single, common Target_Value "2" and a single, common Target_Description of "United States" for each of these two entries. Thus, reference data being transformed in an ETL process will be output in a consistent manner before being loaded into the destination system.

FIG. 1 is a block diagram illustrating a system 100 for detecting reference data tables in an ETL process, according to one embodiment disclosed herein. The system 100 includes a computer 102, which may be a server. The computer 102 may be connected to other computers via a network 130. In general, the network 130 may be a telecommunications network and/or a wide area network (WAN). In a particular embodiment, the network 130 is the Internet.

In another embodiment, the system of a common data integration platform such as an IBM® InfoSphere® Information Server can be installed also across multiple servers representing a single processing system exploiting the hardware resources of several servers. In such an environment, a single job might use resources on one or several servers. (IBM and InfoSphere are trademarks of International Business Machines Corporation, registered in many jurisdictions worldwide.)

The computer 102 generally includes a processor 104 connected via a bus 112 to a memory 106, a network interface device 110, a storage 108, an input device 114, and an output device 116. The computer 102 is generally under the control of an operating system (not shown). Examples of operating systems include UNIX, versions of the Microsoft Windows operating system, and distributions of the Linux operating system. (UNIX is a registered trademark of The Open Group in the United States and other countries. Linux is a registered trademark of Linus Torvalds in the United States, other countries, or both. Microsoft and Windows are trademarks of Microsoft Corporation in the United States, other countries, or both.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single entity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a hard disk drive storage device. Although the storage 108 is shown as a single unit, the storage 108 may be a combination of fixed and/or removable storage devices, such as fixed disc drives, removable memory cards, optical storage, flash memory or solid state storage devices (SSD). The memory 106 and the storage 108 may be part of one virtual address space spanning multiple primary and secondary storage devices. In many cases storage can also be a storage area network (SAN) with one or multiple file systems.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards. Although shown separately from the input device 114, the output device 116 and input device 114 may be combined. For example, a display screen with an integrated touch-screen, a display with an integrated keyboard, or a speech recognition unit combined with a text speech converter may be used.

As shown, the memory 106 of the computer 102 includes an application 133 for detecting reference data tables. That is, the application 133 may generally be configured to detect reference data tables in one or more projects for a data integration solution. As described above, the jobs and programs in these projects typically integrate data from multiple, heterogeneous data sources into a central repository such as a data warehouse. Thus, in one embodiment, application 133 may be configured to detect reference data tables when the process integrates data from multiple sources into a data warehouse. As shown, memory 106 also contains candidate job list 141 and candidate reference data table list 143. Candidate job list 141 generally provides a list of jobs performing a potential reference data operator such as a lookup or join operator, which may reference tables which are reference data tables. The data stored in candidate job list 141 may take any form suitable to identify a job, including XML job identifiers. Candidate job list 141 may itself take many forms, including, but not limited to, a table in a database, an XML data file, or a text file. Candidate reference data table list 143 is a list of tables referenced by a potential reference data operator such as lookup or join operators found in the jobs in candidate job list. The tables listed in candidate reference data table list 143 are tables which may be reference data tables, but further analysis is required before making such a determination. The data stored in candidate reference data table list 143 may take any form suitable to identify each table, and may further include at least a collection of data related to the table, schema, and database, such as whether the table is persistent or non-persistent, a schema information, record counts, whether the table is defined as a reference table in a business glossary, a maximal value partition and one or more scores. Candidate reference data table list 143 may itself take many forms, including, but not limited to, a table in a database, an XML data file, or a text file.

As shown, storage 108 contains source data 135, target data 137, metadata repository 139, business glossary 145, and ontology 147 according to an embodiment disclosed herein. In some embodiments, the storage which contains the source data 135 and target data 137 are attached to the servers running the source and target applications. In some embodiments, the storage containing the business glossary and the ontology might also be attached to a different server then the one(s) used by the data integration software. Source data 135 is the data being operated on by the ETL process, and target data 137 is the resulting output of the ETL process. Metadata repository 139 is a structure which stores metadata representing an ETL job. In some embodiments, the metadata may be represented in an XML format. A job in an ETL process may comprise multiple operations performed using operators on the data in the ETL process. Examples of operators include a SPLIT operator, a FILTER operator, a LOOKUP operator, a PROJECTION operator, and a JOIN operator. The operators are independent of any specific ETL platform, and their particular configuration in the ETL process determines the modifications made to data being operated on. Business glossary 145 allows users to create and manage an enterprise vocabulary and classification system using a domain-specific collection of industry standard terms and definitions. Thus, a business glossary may define a particular business asset as being a reference data table. Alternatively, the business glossary may define the asset as being part of a source or target data system, or the asset may be related to a host that is residing on a source or target system. An exemplary business glossary is the IBM InfoSphere Business Glossary product. Ontology 147 is a general purpose ontology, which provides the structural framework for organizing information. An ontology formally represents knowledge as a set of concepts within a domain, and the relationships between those concepts. Thus, an organization may define, in an ontology, reference data tables, and provide links to related entities. The configuration depicted in FIG. 1 is merely exemplary, as source data 135, target data 137, metadata repository 139, business glossary 145, and ontology 147 may be stored on the same computer, different computers, or any combination thereof.

Figure 2:
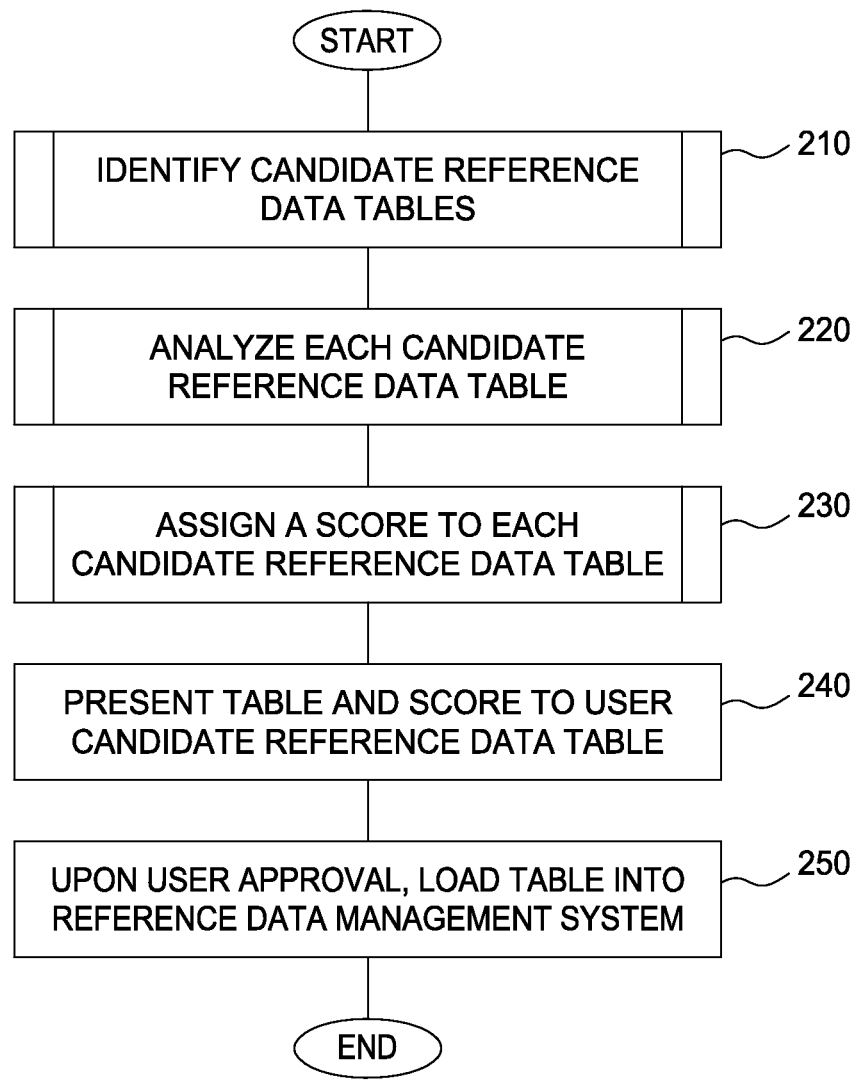
FIG. 2 is a flowchart depicting a method for detecting reference data tables in an ETL process, according to one embodiment disclosed herein.

FIG. 2 is a flowchart depicting a method 200 for detecting reference data tables in an ETL process, according to one embodiment disclosed herein. In one embodiment, the application 133 performs the steps in method 200. The method begins at step 210, where the application 133 identifies candidate reference data tables for all jobs in the metadata repository. In another embodiment, the implementation might allow the user to limit the jobs to be searched in for reference data tables into a smaller subset, such as all jobs within one or multiple projects. Candidate reference data tables are those tables which may be reference data tables, but further examination and analysis is required before such a determination can be made. Embodiments of the techniques used to identify candidate reference data tables are described in further detail below. At step 220, the application 133 analyzes each candidate reference data table. At step 230, the application 133 assigns a weighted score to each candidate reference data table. The score generated at step 230 reflects the likelihood that the candidate reference data table is indeed a reference data table. At step 240, the application 133 presents each candidate reference data table and its associated score to a user, who marks each candidate reference data table as being a reference data table or not. In some embodiments, if the score exceeds a certain threshold, the candidate reference data table may be marked as reference data table automatically. At step 250, the application 133, upon receiving user approval, loads each candidate reference data table marked as a reference data table by the user (or if marked automatically by exceeding a certain threshold for the score) into the reference data management system.

Figure 3:
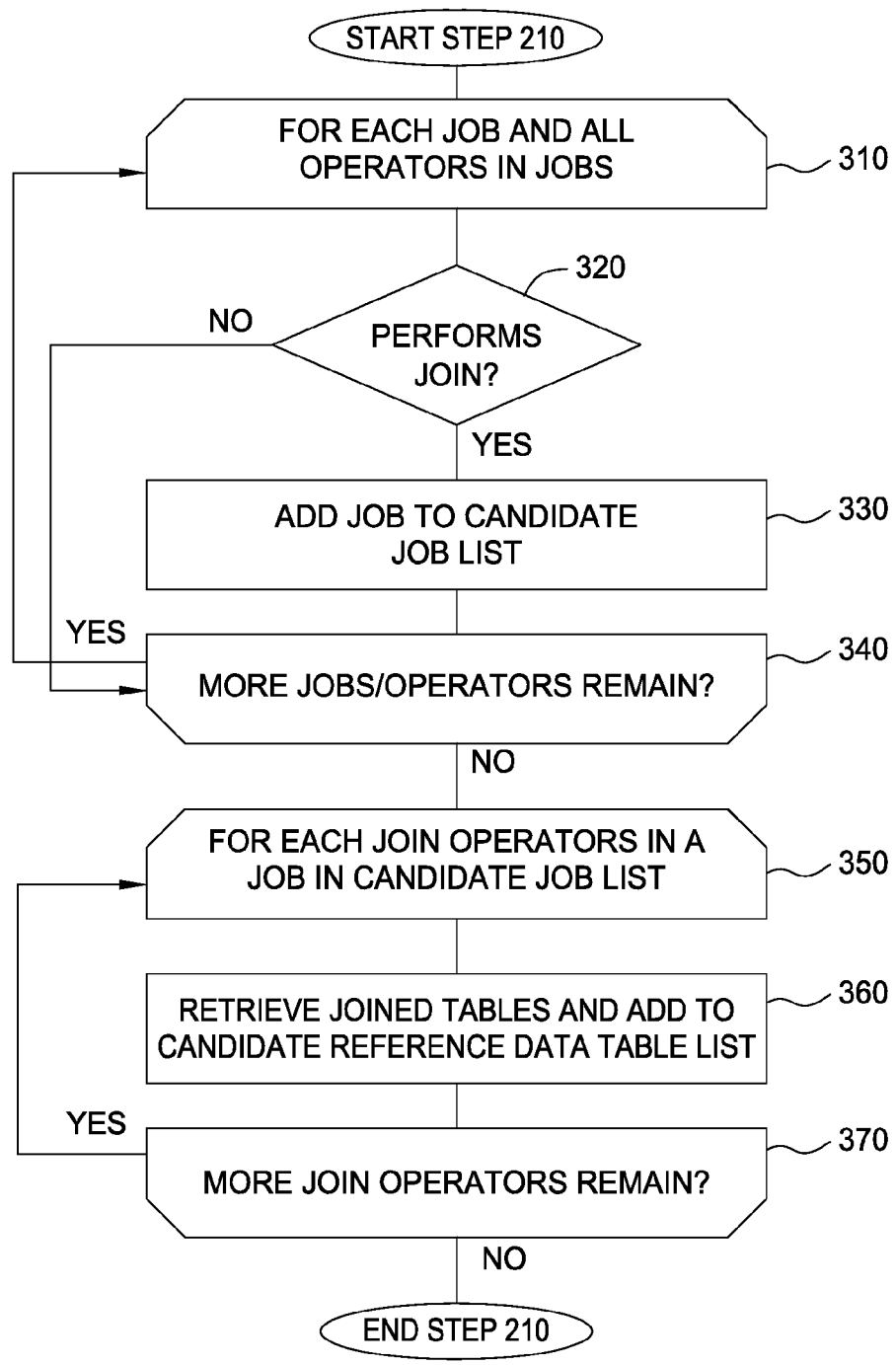
FIG. 3 is a flowchart depicting a method for identifying candidate reference data tables in an ETL process, according to one embodiment disclosed herein.

FIG. 3 is a flowchart depicting a method 300 corresponding to step 210 for identifying candidate reference data tables in an ETL process, according to one embodiment disclosed herein. In one embodiment, the application 133 performs the steps in method 300. Method 300 begins at step 310, where the application 133 executes a loop which includes steps 320-340 for identifying candidate jobs in an ETL process. At step 310, the application 133 executes the loop for each ETL job and for each operator within an ETL job to identify candidate jobs. In some embodiments, each job, and each operator within the job, is contained in metadata repository 139. By parsing the information in metadata repository 139, it is possible to determine which jobs contain candidate reference data operators, examples of which include but are not limited to JOIN operators and LOOKUP operators, and thus qualify as candidate jobs to be placed in the candidate job list. By looking for candidate reference data operators, the application 133 may detect reference data tables whose mappings are being used to expand reference data in source data 135. This occurs because a reference table would be joined against to expand the values in a table from source data 135 which contains reference data. At step 320, the current job or operator is analyzed to determine whether it performs a join operation. In embodiments where metadata repository 139 represents jobs in an XML format, the application 133 parses the XML structure of the job to identify jobs and operators in jobs performing join conditions against another table. Using InfoSphere Information Server as an example, the XML representation of a job might look like the example shown below which is only a portion of the overall XML representation for the job. Parsing this XML means to analyze the XML elements and their content. As shown in the example, the application would find in this XML snippet for the example job in this case for the <Property Name="StageType">PxLookup</Property> which indicates an LOOKUP operator.

<Record Identifier="V0S124" Type="CustomStage" Readonly="0">
    <Property Name="Name">Lookup_DEF_IDs</Property>
    <Property Name="NextID">5</Property>
    <Property Name="InputPins">V0S124P1|V0S124P3|V0S124P4</Property>
    <Property Name="OutputPins">V0S124P2</Property>
    <Property Name="StageType">PxLookup</Property>
    <Property Name="AllowColumnMapping">0</Property>
    <Collection Name="MetaBag" Type="MetaProperty">
    <SubRecord>
    <Property Name="Owner">APT</Property>
    <Property Name="Name">LookupOperator</Property>
    <Property Name="Value">transform</Property While numerous types of platform-specific operators are capable of performing join conditions, embodiments contemplate any of these operators. If, at step 320, the application 133 detects a candidate reference data operator, the method proceeds to step 330. Otherwise, the method proceeds to step 340. At step 330, the application 133 adds the identified jobs performing a candidate reference data operator to candidate job list 141. The method then proceeds to step 340, where the application 133 determines whether more jobs and their operators remain to be analyzed. If more jobs remain, the method returns to step 310. If no jobs remain, the method proceeds to step 350.

At step 350, the application 133 executes a loop which includes steps 360-370 to create a candidate reference data table list 143. Application 133 executes the loop for each job in candidate job list 141. At step 360, the application 133 retrieves the tables being joined by the candidate reference data operator in the job being analyzed, and adds each table to candidate reference data table list 143. At step 370, the application 133 determines whether more candidate reference data operators remain to be processed in candidate job list 141. If more operators remain, the method returns to step 350. Otherwise, method 300 ends. As one skilled in the art would recognize, in alternate embodiments, the candidate reference data table list 143 can be created while creating candidate job list 141 by retrieving the tables which the identified join operators are referencing.

Figure 4:
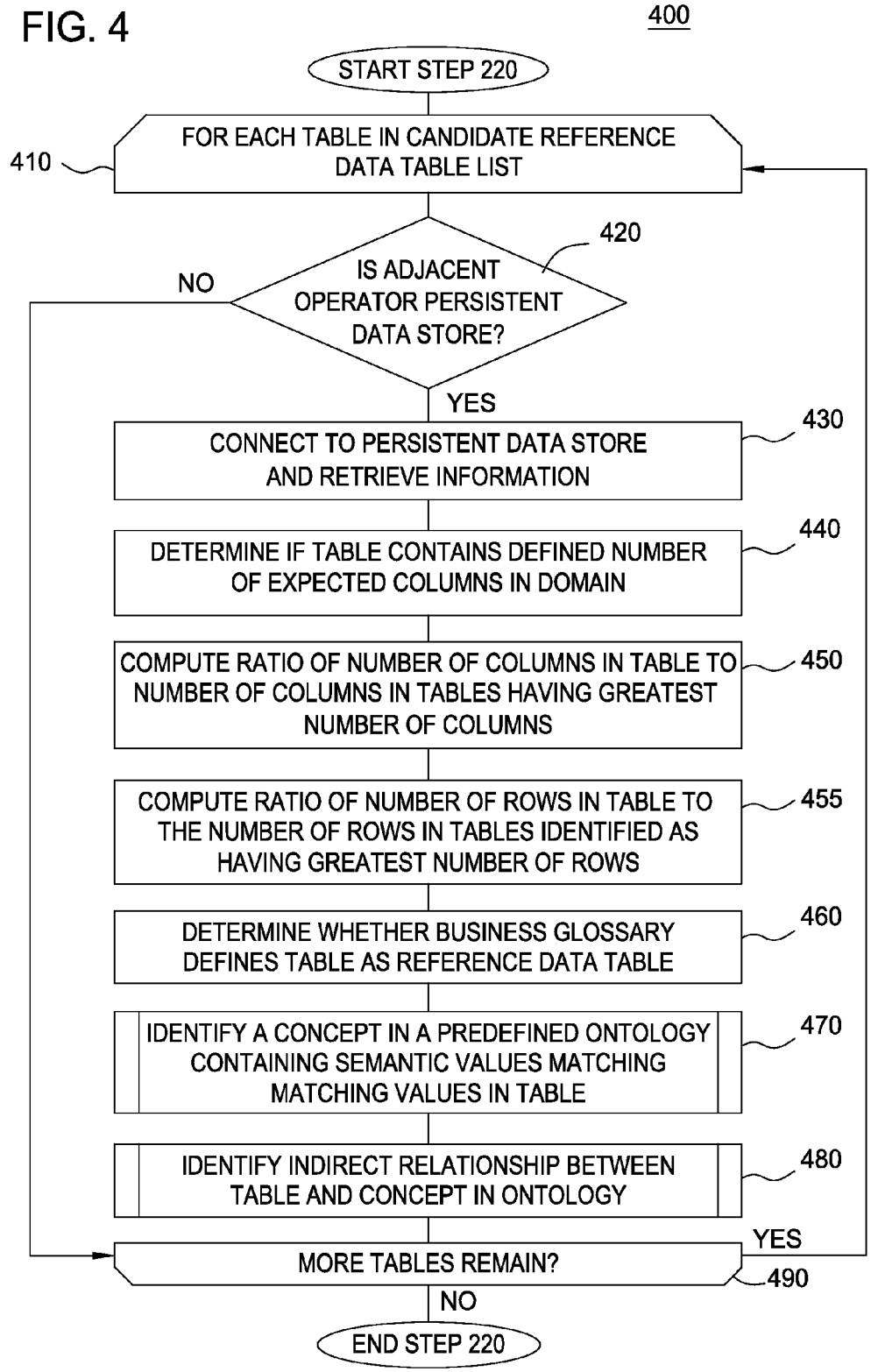
FIG. 4 is a flowchart depicting a method for determining whether a candidate reference data table is a reference data table, according to one embodiment disclosed herein.

FIG. 4 is a flowchart depicting a method 400 corresponding to step 220 for determining whether a candidate reference data table is a reference data table, according to one embodiment of the disclosure. In one embodiment, the application 133 performs the steps in method 400. The method begins at step 410, where the application 133 executes a loop which includes steps 420-490 for analyzing each table in candidate reference data table list 143. Although a complete for loop is depicted, embodiments may perform one, several or all of the steps 440-490 in executing method 400. Steps 440-480 generally include heuristics which, if satisfied, indicate a greater likelihood that the table is a reference data table. At step 420, the application 133 follows a link from the input link on the candidate reference data operator to the adjacent operator providing data, and determines if the adjacent operator is a persistent data store operator—examples include, but are not limited to, database connectors for database systems such as IBM® DB2®, Oracle, etc., or file operators. If the operator is a persistent data store connector, then at step 430, the application 133 gathers login credentials and other relevant information, such as a database name in case the persistent data store is database, to connect to the database. If the operator is not a persistent data store connector, the application 133 proceeds to step 490. (IBM and DB2 are trademarks of International Business Machines Corporation, registered in many jurisdictions worldwide.)

At this point, application 133 may also determine whether the persistent data store connector is an asset linked to an entry in business glossary 145 defined as a source or target data source, and add the information to the table's entry in candidate reference data table list 143. In one embodiment, the application 133 may also connect to the database and performs a full schema discovery of the table and issue a "select count(*)" SQL query to determine the number of records in the table. The schema discovery information, as well as the count of the number of records, may be written to the candidate reference data table list 143 entry corresponding to the current table. Reference data tables usually have a small number of columns and a small number of rows compared to tables containing master data (e.g. customer, etc.) or transactional data (e.g. orders, etc.). The application 133 may also determine the table(s) containing the greatest number of rows and the greatest number of columns. Upon making such a determination, the application 133 may compute a ratio of the number of rows in the candidate reference data table to the number of rows in the table containing the greatest number of rows. The application 133 may also compute a ratio of the number of columns in the candidate reference data table to the number of columns in the table containing the greatest number of columns. Alternatively, the application 133 may set a flag indicating whether the table is a persistent or non-persistent table. Also, based on the discovered metadata, a flag might be set whether or not the total number of columns in the table or file is two columns. In other embodiments, the ratio of rows to columns may be written as a variable to the entry in candidate reference data table list 143, and the application 133 will determine whether the number of columns in the candidate reference data table equal this variable. Based on this information, the application 133 will able to determine whether the table has the defined number of columns at step 440 and the ratios at step 450 and 455. At step 440, application 133 determines whether the table has the defined number of columns expected of a reference data table in the domain. If the candidate reference data table contains the defined number of columns a reference data table is expected to have in the domain, the greater the likelihood that the table is a reference data table. In some embodiments, the application 133 determines whether the number of columns in the candidate reference data table approaches the defined number of columns. Application 133 may determine this based on the column count or the flag set at step 430. At step 450, the application 133 may also compute the ratio of the number of columns in the candidate reference data table to the number of columns in the table(s) identified as having the greatest number of columns. At step 455, the application 133 computes the ratio of the number of rows in the candidate reference data table to the number of rows in the table(s) identified as having the greatest number of rows. In embodiments where a ratio was not computed at step 430, application 133 computes the ratio using the count of rows and columns stored at step 430. In embodiments where the counts were computed at step 430, application 133 may simply retrieve the ratios. If the ratio of the number of rows in the candidate reference data table to the number of rows in the table(s) containing the greatest number of rows is relatively small, chances are greater that the candidate reference data table is a reference data table. If the ratio of the number of columns in the candidate reference data table to the number of columns in the table(s) containing the greatest number of columns is relatively small, chances are greater that the candidate reference data table is a reference data table. As the ratios approach zero (a small number in the candidate reference data table divided by a large number in the table(s) containing the greatest number of rows or columns), the greater the likelihood that the candidate reference data table is a reference data table.

At step 460, application 133 searches business glossary 145 for the table in candidate reference data table list 143. If the table is found, application 133 checks to determine whether the table is defined as a reference data table. Such a definition may definitively indicate that the table is a reference data table (at least within a given business domain). After searching the business glossary 145, application 133 updates the entry for the table in candidate reference data table list 143 to indicate whether the table is defined as a reference data table in the business glossary. Examples of the indication in candidate reference data table list 143 include, but are not limited to, a textual string and a Boolean value.

Figure 6:
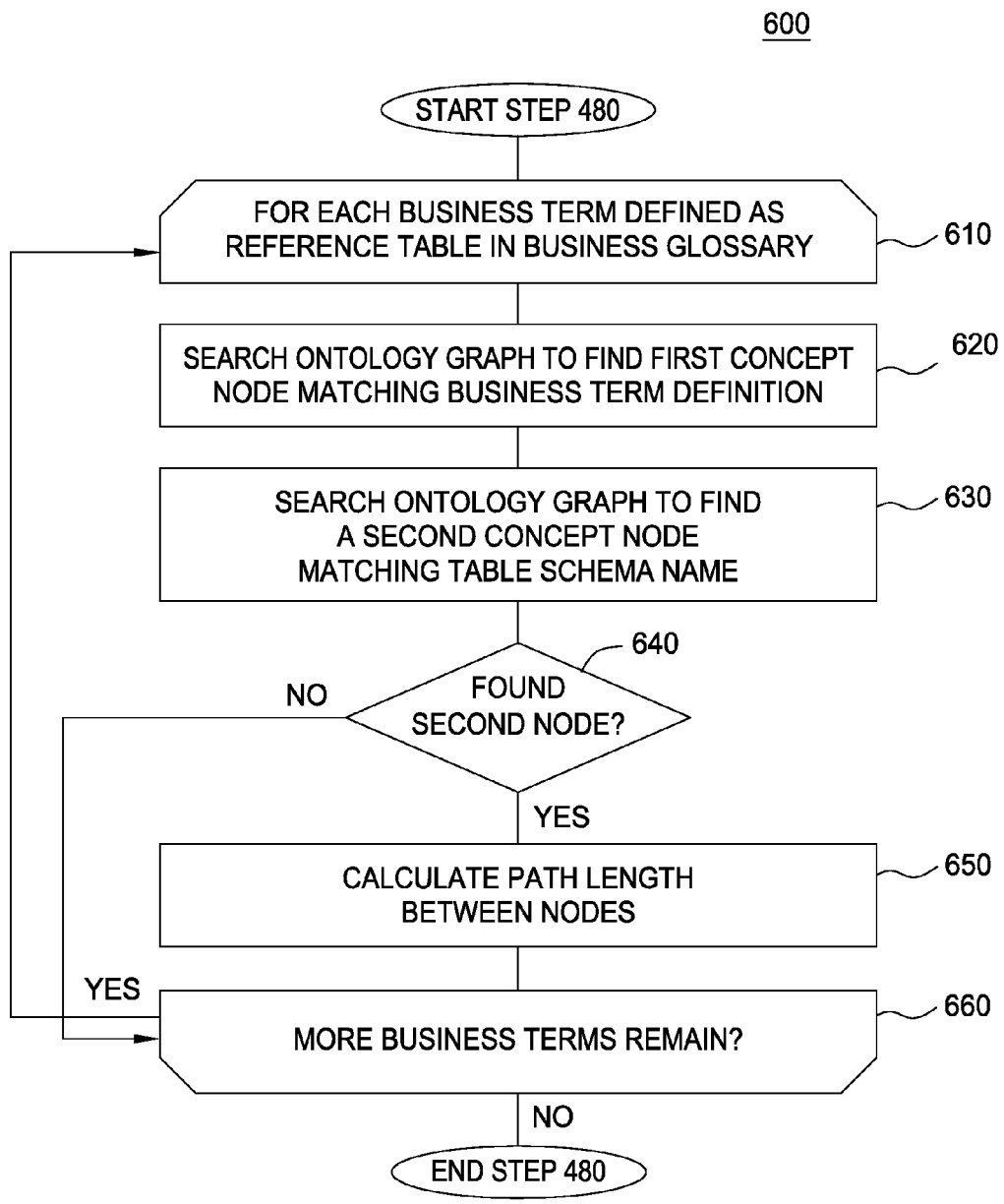
FIG. 6 is a flowchart depicting a method for detecting an indirect relationship between a table and a concept in an ontology, according to one embodiment disclosed herein.
Figure 7:
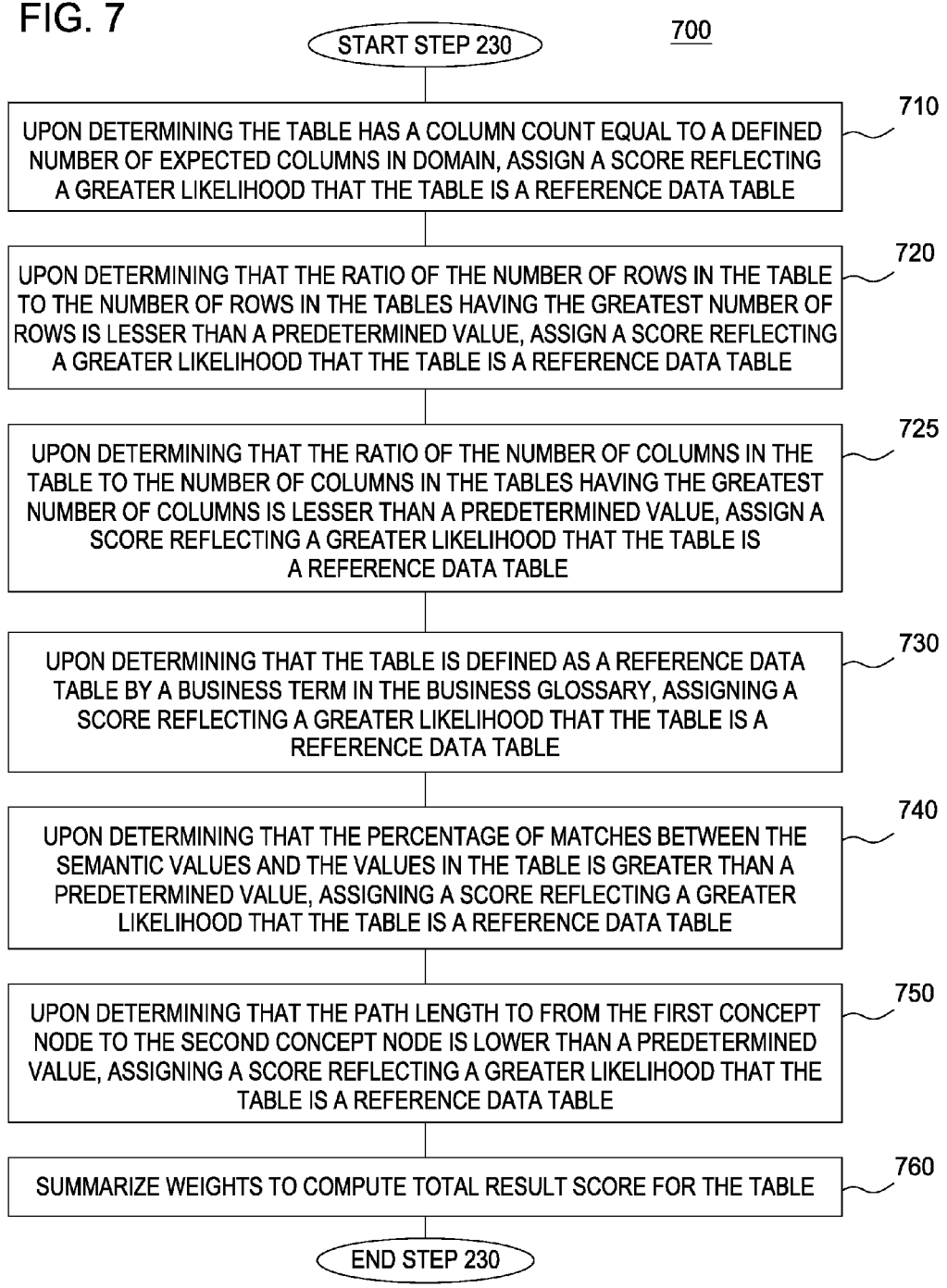
FIG. 7 is a flowchart depicting a method for a method for scoring candidate reference data tables, according to one embodiment disclosed herein.

Application 133 may attempt to leverage ontology 147 and its representation of the domain of source data 135 models to validate the table as a reference data table. At step 470, application 133 attempts to identify a concept in ontology 147 containing semantic values matching values in the table. In some embodiments, at step 470, application 133 calculates a potential maximal value partition, $\{N, D_k\}$ corresponding to the table. FIG. 6, described below, provides an example of calculating a maximal value partition. The resulting maximal value partition is used to calculate a score for the table based on the shared number of reference data column elements that $D_k$ contains. FIG. 7, described below, provides an example of calculating a score based on a maximal value partition. If N is not null, the maximal value partition $\{N, D_k\}$ and its values may be stored in the entry for the table in candidate reference data table list 143.

Figure 5:
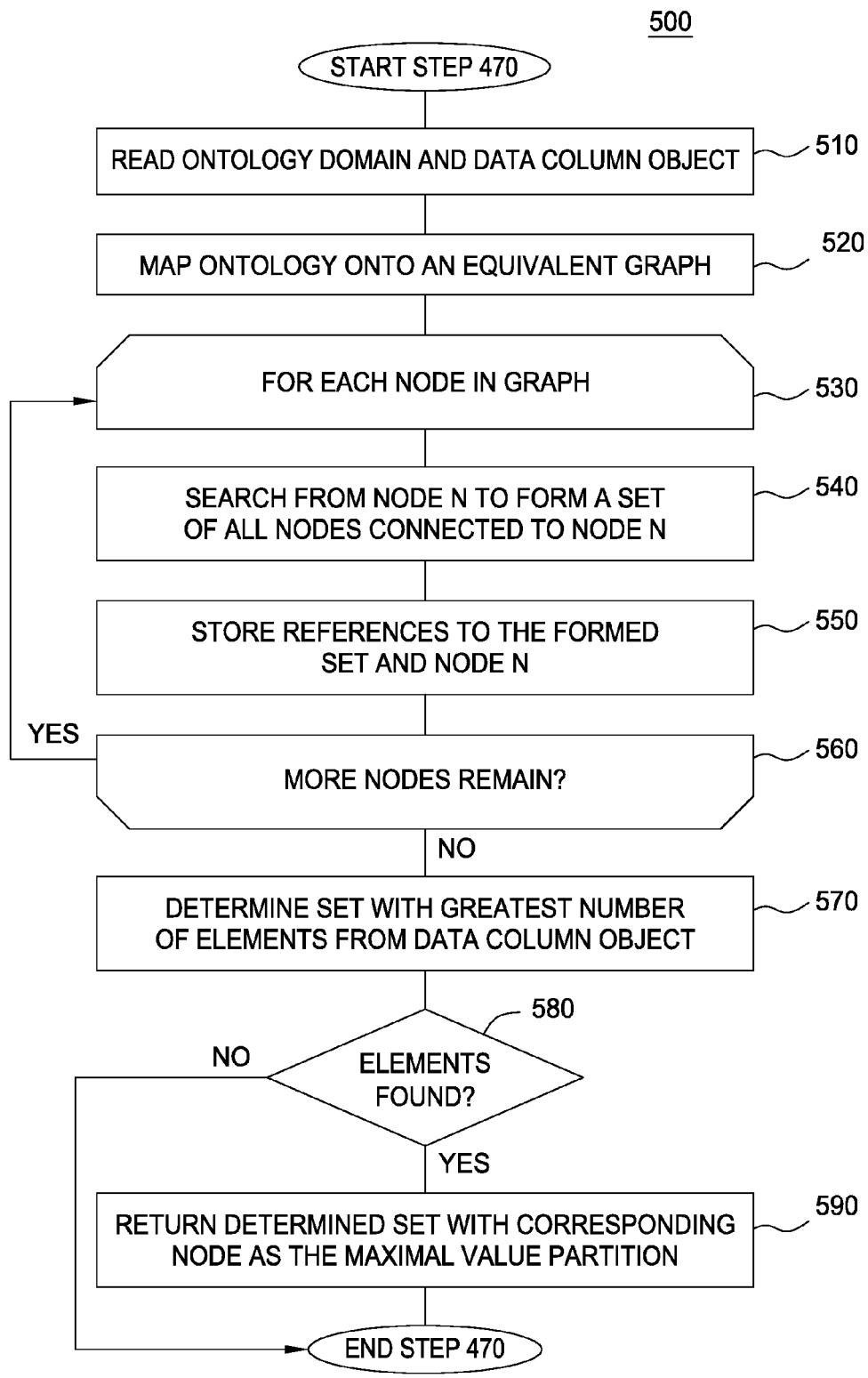
FIG. 5 is a flowchart depicting a method for calculating a maximal value partition, according to one embodiment disclosed herein.

At step 480, the application 133 attempts to identify an indirect relationship between the table and a concept in the ontology. FIG. 5, described in detail below, provides an example of identifying an indirect relationship between the table and a concept in the ontology. If the application 133 detects an indirect relationship, the distance between the two discovered nodes in the ontology is saved to the entry for the table in candidate reference data table list 143. Based on this distance, the application 133 may calculate a score as described in reference to FIG. 7.

At step 490, the application 133 determines whether more entities remain to be examined. If so, the method returns to step 410. Otherwise, method 400 terminates.

FIG. 5 is a flowchart depicting a method 500 corresponding to step 470 for identifying a concept in ontology 147 containing semantic values matching values in the table by computing a maximal value partition. In one embodiment, the application 133 performs the steps in method 500. Method 500 leverages the notion of value partitions in ontologies to discover a class concept that is being partitioned by a set of disjoint classes, which represent concepts for the values present in the description column (C) from a candidate reference data table. In any domain representation, there are many "attributes," or "modifiers" that are used to describe other concepts. These attributes often take a value from a set of candidate values (enumeration, etc). For these purposes, in ontology modeling, there are mechanisms to specify a "collection of values." One may assume that these collections of values represent the data columns present in reference data tables. For a class concept N captured in an ontology O, we define a value-partition, V, to be a set of classes $N_i$, such that N=Union $(N_i)$ such that all $N_i$ are disjoint. This essentially partitions the class N into $N_i$ partitions, and thus V is a partitioning of N. Other embodiments may call this an "enumeration," a "partition," or a "set." Further, we define a maximal value partition, V', in an ontology O with respect to a set D as the value partition that contains the maximum elements from set D.

With this background, the following method 500 for identification of V' for a column $C=\{C_i\}$ of the table may be used. The method begins at step 510, where application 133 reads domain ontology O and the column $C=\{C_i\}$. The method then calculates the maximal value partition, V', in the ontology O with respect to the set C as follows.

We assume OWL-Lite conventions in this algorithm; therefore there exists a corresponding RDF graph for an ontology. OWL-Lite is a sublanguage of the OWL Web Ontology Language, which is a knowledge representation language for authoring ontologies (see more at http://www.w3.org/TR/owl-features/, which is incorporated herein by reference). Therefore, at step 520, the application 133 maps ontology O to equivalent RDF graph G. At step 530, a loop containing steps 540-560 is executed, where for each node N in the graph, the application 133 generates a set of nodes connected to the current node N in the graph. The loop begins at an arbitrary node N and executes until all nodes are visited. At step 540, the application 133 searches from selected node N and forms a set of all nodes connected to selected node N. To determine the set of nodes connected to the selected node N, the application 133 performs a search (breadth-first, depth-first, or a similar variant) from the selected node N and expands all the nodes that are directly connected to N. At step 550, the application 133 stores references to both the set and selected node N. In one embodiment, application puts the set and the selected node in a set $D_N$. At step 560, the application 133 determines whether more nodes in the ontology graph remain to be searched. If more nodes remain, the application 133 returns to step 530. Otherwise, the application 133 proceeds to step 570.

At step 570, the application 133 compares the sets of nodes with the data column object C and determines the set with the greatest number of elements from C. Application 133 compares C with $\{D_i\}$, for all i, and determines the set $D_k$ with the greatest number of elements from the set C. At step 580, the application 133 determines if any elements of C were found. If none of the elements were found, null is returned and the method terminates. If elements are found, the application 133 proceeds to 590, where the application 133 returns the determined set with the corresponding selected node as the maximal value partition. Here, the application 133 defines N as the class concept corresponding to the node k, and returns $\{N, D_k\}$ as the maximal value partition and the actual contents of the partition.

To understand the method 500, a column is presented from an exemplary reference data table with the following set of data values $\{c_i\}$:

---
UNITED STATES
UNITED KINGDOM
GERMANY
---

Consider an OWL-lite enterprise ontology which captures relationships and knowledge specific to the data model for the source. Assume that in the ontology graph, class concepts for Germany, United Kingdom and United States are defined subclasses of the concept CountrySetA. Since in the example ontology, we only have these three countries as subclasses of CountrySetA, we can safely say that the concept CountrySetA has been exhaustively partitioned by Germany, United Kingdom and United States and they form a value-partition of CountrySetA.

Referring back to the source description column above, we observe that out of the data values, we can find three (Germany, United Kingdom and United States) in the value partition present in the ontology. Assuming that we cannot find any other value-partition that contains more than these three data values, we then say that the above value-partition is maximal. However, if we could find another value-partition that contained four countries from the given column, then we would identify that one as maximal.

Since the domain of the source data model might change over time (in turn changing the domain ontology), we need a way to scale this approach and not require to re-compute the value partitions all over again. One of the ways to overcome this exponential complexity would be to pre-compute the value partitions and then cache them for further reference. Then, we could perform a partial evaluation whenever the ontology changes. Another alternative would be to have this knowledge encoded at the time the ontology is being crafted. Thus, it would be the responsibility of the steward or the creator to update the list of value partitions as he adds, new knowledge. For example, if one adds a new country (Greece) to the domain of an ontology, we don't have to recompute every single value partition, we could just add a concept Greece to the pre-existing and catalogued value-partition pertaining to European countries.

FIG. 6 is a flowchart depicting a method 600 corresponding to step 480 for detecting an indirect relationship between a table in candidate reference data table list 143 and a concept in an ontology, according to one embodiment disclosed herein. In one embodiment, the application 133 performs the steps in method 600. The method begins at step 610, where, for each term in business glossary 145 defined as a reference data table, the application 133 executes a loop which includes steps 620-660 for detecting an indirect relationship between a table and a concept in ontology 147. At step 620, the application 133 searches the graph of ontology 147 to find a first concept node matching the business term definition. At step 630, the application 133 searches from the first concept node to find a second concept node matching the table metadata. In some embodiments, the table metadata is the table's schema name. At step 640, application 133 determines whether a second concept node was found. If a second concept node was not found, the application 133 proceeds to step 660. If a second concept node is found, the application 133 proceeds to step 650, where the application 133 calculates the path length between the first and second nodes, and stores the path length in the entry in candidate reference data table list 143 corresponding to the table. At step 660, the application 133 determines whether other business terms remain to be searched. If yes, the application 133 returns to step 610; otherwise, the method terminates.

FIG. 7 is a flowchart depicting a method 700 corresponding to step 230 for scoring candidate reference data tables, according to one embodiment disclosed herein. In one embodiment, the application 133 performs the steps in method 700. As is recognized by one skilled in the art, in alternate embodiments, a score may be assigned using the following methods during execution of method 400. While FIG. 7 is depicted as a flowchart, embodiments disclosed herein contemplate using one, several, or all of the scoring methods depicted therein to score a candidate reference data table in list 143. The scoring methods can take any suitable form to indicate that one table may have a greater likelihood than another that the table is a reference data table. In some embodiments, the scores may be numeric, for example in a range of 0-1, 0-10, 0-100, or any suitable range. Embodiments contemplate all scoring methods. In embodiments where more than one scoring method is utilized, a single score may be updated by each subsequent method or a score for each method may be recorded. In embodiments where multiple scores are recorded, the score assigned to the table to be presented to the user may be a composite of each score, or each individual score may be presented. The composite may be weighted to place more importance on different scoring methods, or may be an average of each score. In other embodiments, if scores from certain scoring methods indicate a greater likelihood that the table is a reference data table, scores from other scoring methods may be disregarded in generating the composite score, or the score from the method indicating a greater likelihood that the table is a reference data table may be presented in lieu of a composite score.

At step 710, the application 133 assigns the table a score reflecting a greater likelihood that the table is a reference data table if the table has a column count approaching the default column count for the domain. Application 133 made this determination as described above in reference to step 440. In one embodiment, the application 133 can verify that the table has a column count approaching the default column count for the domain by referencing the table's entry in candidate reference table list 143, which contains the complete schema information including information on all columns and their total number as well and record count information. In another embodiment, the application 133 can verify that the table has a column count approaching the default column count for the domain by checking a field indicating that the table fulfills this condition. The default column count for the domain may be set as a variable. At step 720, the application 133 assigns a score reflecting a greater likelihood that the table is a reference data table if the ratio of the number of rows in the candidate reference table to the number of rows in the table(s) containing the greatest number of rows computed in at step 430 is less than a predetermined value. At step 725, the application 133 assigns a score reflecting a greater likelihood that the table is a reference data table if the ratio of the number of columns in the candidate reference table to the number of columns in the table(s) containing the greatest number of columns computed in at step 430 is less than a predetermined value. The predetermined value may be any value sufficient to indicate a threshold under which the ratios indicate that the number of rows or columns is such that there is a greater likelihood that a table is a reference data table. In some embodiments, the predetermined value is defined by the application 133. In other embodiments, the predetermined value is defined by a user. In some embodiments, the application 133 computes the ratio by referencing the table's record count information in its entry in candidate reference table list 143. In other embodiments, the ratio is stored in candidate reference data table list 143, and is retrieved by the application 133. Once the application 133 has the ratio, the application 133 assigns a score to the table. In some embodiments, the ratio must be higher than a predetermined value to receive a score reflecting a greater likelihood that the table is a reference data table. In some embodiments, the predetermined value is defined by the application 133. In other embodiments, the predetermined value is defined by a user. Generally the predetermined value is a value sufficient to reflect a greater likelihood that the table is a reference data table. In some embodiments, the score may be directly proportional to the ratio.

At step 730, the application 133 assigns a score reflecting a greater likelihood that the table is a reference data table upon determining that the table is defined as a reference data table in a business glossary. As described above, the application 133 made this determination at step 440. Application 133 may verify this determination by checking the corresponding values in the table's entry in candidate reference data table list 143. In some embodiments, this express definition may be relied upon to form a definitive conclusion that the table is a reference data table, and the corresponding score may be assigned to the table. In some embodiments, other scoring methods may be disregarded if the table has been defined as a reference data table in the business glossary.

At step 740, the application 133 assigns a score reflecting a greater likelihood that the table is a reference data table if the percentage of reference data column elements the table shares in common with the maximal value partition computed at step 450 exceeds a predetermined value. The predetermined value may be any value sufficient to establish a threshold past which the number of common elements is sufficient to reflect a greater likelihood that the table is a reference data table. In some embodiments, the predetermined value is defined by the application 133. In other embodiments, the predetermined value is defined by a user. As stated above, the function computing maximal value partition $\{N, D_k\}$ returns the maximal value partition as well as the actual contents of the partition. Based on this information, the application 133 may calculate a corresponding score. If N is not null, a score is assigned based on the percentage of reference data column elements (C) the table shares with $D_k$. If the elements in C are an exact match to the elements of $D_k$, a score reflecting a greater likelihood that the table is a reference data table is assigned. In some embodiments, a score reflecting the greatest likelihood that the table is a reference data table may be assigned if the elements in C and $D_k$ are an exact match. If $D_k$ has fewer total elements than C, or if $D_k$ has extra elements not in C, a score reflecting a lesser likelihood that the table is a reference data table is assigned. In one embodiment, a formula for score calculation may be represented as: ({Number of matches between $D_k$ and C}/{Number of total elements in C})−0.1*({Number of mismatches between $D_k$ and C}/{Number of total elements in C}). Generally, any formula suitable for capturing these principles may be implemented. Once the application 133 has computed the score, it also saves the score in the entry associated with the table in candidate reference data table list 143.

At step 750, the application 133 assigns a score indicating a greater likelihood that the table is a reference data table based upon a determination that the path length from a first concept node to a second concept node in an ontology is lower than a predetermined value. Application 133 detects the nodes and calculates the path length as described above in conjunction with step 460. The predetermined value may be any value sufficient to capture the concept that the closer the two nodes are, the more closely related they are. In some embodiments, the predetermined value is defined by the application 133. In other embodiments, the predetermined value is defined by a user. Thus, if the first concept node represents a reference data table, a second concept node linked closely to the first concept node may also represent a reference data table. Conversely, the further the second concept node is from the first concept node, the less likely the table is a reference data table. Therefore, by calculating the path length between the nodes, the application 133 may determine the distance between the nodes, and assign a score reflecting the likelihood that the table is a reference data table. Application 133 compares the computed path length to the predetermined value to determine whether the path length is less than the predetermined value. If the path length is less than the predetermined value, a score indicating a greater likelihood that the table is a reference data table is assigned. In some embodiments, the score may be computed in a manner that is inversely proportional to the computed path length. In other embodiments, the path length itself is the score. Generally, any suitable scoring method is contemplated in computing the score.

At step 760, the application 133 summarizes the scores computed at steps 710-750 to compute a single total result score for the table. In some embodiments, the scores computed at steps 710-750 are weighted to compute the total result score. In other embodiments, the scores computed at steps 710-750 are equally weighted to compute the total result score, i.e. the scores are averaged. Generally, any suitable method is contemplated in computing the total result score.

FIG. 8 illustrates an exemplary graphical user interface (GUI) screen 800 displaying an exemplary list 810 of candidate reference data tables presented to a user, according to one embodiment disclosed herein. In one embodiment, the application 133 generates the list 810. As shown, list 810 contains a plurality of rows $815_{1-N}$ corresponding to each entry in candidate reference data table list 143, which is identified in column 820. In column 825, a total result score associated with the table is presented. As shown, the scores in column 825 are sorted in descending order, but may be sorted in any order, according to embodiments disclosed herein. Furthermore, the total result score is shown in column 825, according to an embodiment disclosed herein. In other embodiments, this score is a single score selected from one of the scores calculated in method 700. In alternate embodiments, several or all of the scores calculated in method 700 may be presented to the user. Column 830 depicts radio buttons which accept user input as to whether the table $815_{1-N}$ is a reference data table. Embodiments disclosed herein contemplate any method of receiving input as to whether the table is a reference data table, for example, checkboxes and drag down menus. Column 835 depicts a checkbox corresponding to each table $815_{1-N}$, in which the user specifies whether to load the table into a reference data management system. Embodiments contemplate any method of receiving input as to whether to load the table into a reference data management system, for example, checkboxes and drag down menus. Element 840 is a reset button, which would clear all user input from the screen. Element 845 is a submit button, which, once clicked, will load all of the entities which have been marked as reference data tables in column 835 into the reference data management system.

The flowchart and block diagrams in the Figures illustrate the architecture, functionality, and operation of possible implementations of systems, methods and computer program products according to various embodiments disclosed herein. In this regard, each block in the flowchart or block diagrams may represent a module, segment, or portion of code, which comprises one or more executable instructions for implementing the specified logical function(s). It should also be noted that, in some alternate implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for identifying, in an extract-transform-load data integration process, reference data tables containing a set of values describing data, comprising:
   identifying, by operation of one or more computer processors, at least a first reference data operator in the process, wherein the first reference data operator references one or more tables; and
   determining whether at least a first table referenced by the reference data operator is a reference table by assigning, to the first table, a score reflecting a greater likelihood that the first table is a reference data table upon determining at least one of:
      that a computed number of columns of the first table equals a number of columns a reference data table has been defined to contain;
      that a computed ratio of a count of a number of rows of the first table to a count of a number of rows in a table having the greatest number of rows in a domain is less than a predetermined value;
      that a computed ratio of a count of the number of columns of the first table to a count of a number of columns in a table having the greatest number of columns in a domain is less than a predetermined value;
      that the first table is defined as a reference data table by a first business term in a business glossary;
      that a computed percentage of matches between semantic values in a first concept in a predefined ontology and values in the first table is greater than a predetermined value; and
      that a computed path length from a first concept node in an ontology graph to a second concept node in the ontology graph is lower than a predetermined value, wherein the first concept node matches a second business term defined as a reference data table in the business glossary, wherein the second concept node contains semantic values matching a description of the first table.

2. The computer-implemented method of claim 1, further comprising:
   upon determining that the first table is a reference data table based on the score exceeding a predetermined threshold, loading the first table into a data store.

3. The computer-implemented method of claim 1, further comprising:
   presenting the first table to a user; and
   upon receiving user input specifying that the first table is a reference data table, loading the first table into a data store.

4. The computer-implemented method of claim 1, wherein identifying at least the first reference data operator comprises determining whether the first reference data operator performs a join operation against the one or more referenced tables.

5. The computer-implemented method of claim 1, wherein assigning the score to the first table further comprises at least one of:
   computing the ratio of the count of the number of rows in the first table to the count of the number of rows in the table having the greatest rows of columns in the domain;
   computing the ratio of the count of the number of columns in the first table to the count of the number of columns in the table having the greatest number of columns in the domain;
   searching the business glossary for the first business term defining the first table as a reference data table;
   identifying the first concept in the predefined ontology containing semantic values matching values in the first table; and
   identifying an indirect relationship between the first table and a second one or more concepts in the ontology.

6. The computer-implemented method of claim 5, wherein identifying the indirect relationship between the first table and the second one or more concepts in the ontology comprises:
   for each business term defined as a reference data table in the business glossary:
      searching the ontology graph to find a first concept node that matches the second business term definition;
      performing a directed search on the ontology graph from the first concept node to discover the second concept node containing semantic values matching the description of the first table; and
      calculating the path length between the first concept node and the second concept node.

7. The computer-implemented method of claim 6, wherein assigning the score to the first table further comprises at least one of:
   upon determining that the ratio of the count of the number of rows of the first table to the count of the number of rows in the table having the greatest number of rows is less than a predetermined value, assigning a score reflecting a greater likelihood that the first table is a reference data table; and
   upon determining that the ratio of the count of the number of columns of the first table to the count of the number of columns in the table having the greatest number of columns is less than a predetermined value, assigning a score reflecting a greater likelihood that the first table is a reference data table.

8. A computer program product for identifying, in an extract-transform-load data integration process, reference data tables containing a set of values describing data, the computer program product comprising:
   a computer-readable storage medium having computer-readable program code embodied therewith, wherein, when executed by one or more computer processors, the computer-readable program code performs an operation comprising:
      identify at least a first reference data operator in the process, wherein the first reference data operator references one or more tables; and
      determining whether at least a first table referenced by the reference data operator is a reference table by assigning, to the first table, a score reflecting a greater likelihood that the first table is a reference data table upon determining at least one of:
         that a computed number of columns of the first table equals a number of columns a reference data table has been defined to contain;

that a computed ratio of a count of a number of rows of the first table to a count of a number of rows in a table having the greatest number of rows in a domain is less than a predetermined value;

that a computed ratio of a count of the number of columns of the first table to a count of a number of columns in a table having the greatest number of columns in a domain is less than a predetermined value;

that the first table is defined as a reference data table by a first business term in a business glossary;

that a computed percentage of matches between semantic values in a first concept in a predefined ontology and values in the first table is greater than a predetermined value; and that a computed path length from a first concept node in an ontology graph to a second concept node in the ontology graph is lower than a predetermined value, wherein the first concept node matches a second business term defined as a reference data table in the business glossary, wherein the second concept node contains semantic values matching a description of the first table.

9. The computer program product of claim 8, wherein the operation further comprises:

upon determining that the first table is a reference data table based on the score exceeding a predetermined threshold, loading the first table into a data store.

10. The computer program product of claim 8, wherein the operation further comprises:

presenting the first table to a user; and upon receiving user input specifying that the first table is a reference data table, loading the first table into a data store.

11. The computer program product of claim 8, wherein identifying at least the first reference data operator comprises determining whether the first reference data operator performs a join operation against the one or more referenced tables.

12. The computer program product of claim 8, wherein assigning the score to the first table further comprises at least one of:

computing the ratio of the count of the number of rows in the first table to the count of the number of rows in the table having the greatest rows of columns in the domain;

computing the ratio of the count of the number of columns in the first table to the count of the number of columns in the table having the greatest number of columns in the domain;

searching the business glossary for the first business term defining the first table as a reference data table;

identifying the first concept in the predefined ontology containing semantic values matching values in the first table; and identifying an indirect relationship between the first table and a second one or more concepts in the ontology.

13. The computer program product of claim 12, wherein identifying the indirect relationship between the first table and the second one or more concepts in the ontology comprises:

for each business term defined as a reference data table in the business glossary:

searching the ontology graph to find a first concept node that matches the second business term definition;

performing a directed search on the ontology graph from the first concept node to discover the second concept node containing semantic values matching the description of the first table; and calculating the path length between the first concept node and the second concept node.

14. The computer program product of claim 13, wherein assigning the score to the first table further comprises at least one of:

upon determining that the ratio of the count of the number of rows of the first table to the count of the number of rows in the table having the greatest number of rows is less than a predetermined value, assigning a score reflecting a greater likelihood that the first table is a reference data table; and upon determining that the ratio of the count of the number of columns of the first table to the count of the number of columns in the table having the greatest number of columns is less than a predetermined value, assigning a score reflecting a greater likelihood that the first table is a reference data table.

15. A system, comprising:

one or more computer processors; and a memory containing a program, which when executed by the one or more computer processors is configured to perform an operation for detecting, in an extract-transform-load data integration process, reference data tables containing a set of values describing data, the operation comprising:

identifying at least a first reference data operator in the process, wherein the first reference data operator references one or more tables; and determining whether at least a first table referenced by the reference data operator is a reference table by assigning, to the first table, a score reflecting a greater likelihood that the first table is a reference data table upon determining at least one of:

that a computed number of columns of the first table equals a number of columns a reference data table has been defined to contain;

that a computed ratio of a count of a number of rows of the first table to a count of a number of rows in a table having the greatest number of rows in a domain is less than a predetermined value;

that a computed ratio of a count of the number of columns of the first table to a count of a number of columns in a table having the greatest number of columns in a domain is less than a predetermined value;

that the first table is defined as a reference data table by a first business term in a business glossary;

that a computed percentage of matches between semantic values in a first concept in a predefined ontology and values in the first table is greater than a predetermined value; and that a computed path length from a first concept node in an ontology graph to a second concept node in the ontology graph is lower than a predetermined value, wherein the first concept node matches a second business term defined as a reference data table in the business glossary, wherein the second concept node contains semantic values matching a description of the first table.

16. The system of claim 15, the operation further comprising:

upon determining that the first table is a reference data table based on the score exceeding a predetermined threshold, loading the first table into a data store.

17. The system of claim 15, wherein identifying at least the first reference data operator comprises determining whether the first reference data operator performs a join operation against the one or more referenced tables.

18. The system of claim 15, wherein assigning the score to the first table further comprises at least one of:
computing the ratio of the count of the number of rows in the first table to the count of the number of rows in the table having the greatest rows of columns in the domain;
computing the ratio of the count of the number of columns in the first table to the count of the number of columns in the table having the greatest number of columns in the domain;
searching the business glossary for the first business term defining the first table as a reference data table;
identifying the first concept in the predefined ontology containing semantic values matching values in the first table; and
identifying an indirect relationship between the first table and a second one or more concepts in the ontology.

19. The system of claim 18, wherein identifying the indirect relationship between the first table and the second one or more concepts in the ontology comprises:
for each business term defined as a reference data table in the business glossary:
searching the ontology graph to find a first concept node that matches the second business term definition;
performing a directed search on the ontology graph from the first concept node to discover the second concept node containing semantic values matching the description of the first table; and
calculating the path length between the first concept node and the second concept node.

20. The system of claim 19, wherein assigning the score to the first table further comprises at least one of:
upon determining that the ratio of the count of the number of rows of the first table to the count of the number of rows in the table having the greatest number of rows is less than a predetermined value, assigning a score reflecting a greater likelihood that the first table is a reference data table; and
upon determining that the ratio of the count of the number of columns of the first table to the count of the number of columns in the table having the greatest number of columns is less than a predetermined value, assigning a score reflecting a greater likelihood that the first table is a reference data table.

* * * * *